United States Patent Office 2,710,798
Patented June 14, 1955

2,710,798

METHOD OF PRODUCING SODIUM FROM SODIUM FERRITE

Virgil L. Hansley, Cincinnati, Ohio, assignor to E. I. du Pont de Nemours and Company, Wilmington, Del., a corporation of Delaware No Drawing. Application April 4, 1952,
Serial No. 280,641

4 Claims. (Cl. 75—66)

This invention relates to the production of sodium and more particularly to the production of sodium from sodium ferrite.

At the present time sodium metal is produced commercially almost entirely by electrolytic processes. These processes are quite efficient but consume large quantities of electric current, now in short supply. Before the development of suitable electrolytic cells sodium was prepared chiefly by means of the DeVille process which utilized a mixture of sodium carbonate, charcoal and lime. Unfortunately DeVille's method forms a mixture of carbon monoxide and sodium vapor which can be separated only with difficulty.

It is accordingly an object of this invention to produce a new and useful method for manufacturing sodium. Another object of the invention is development of a process for producing metallic sodium by chemical, as opposed to electrochemical, means. A further object of the invention is development of a method for producing sodium chemically which avoids the necessity for separating sodium from carbon monoxide. A still further object of the invention is development of a method for producing sodium by the reduction of sodium ferrite.

I have found that the above-enumerated and other objects of the invention may be accomplished by reacting sodium ferrite with iron and distilling off the sodium so produced in the presence of an inert atmosphere. Details of the reactive process will be evident from the remainder of this specification.

Sodium ferrite was prepared according to the reaction of the Lowig process, British Patent 4,364 (1882), which may be represented by the equation:

(1) $Na_2CO_3 + Fe_2O_3 \rightarrow 2NaFeO_2 + CO_2$

Ball-milled mixtures of $Fe_2O_3$ and $Na_2CO_3$ in stoichiometric proportions were heated in alundum crucibles at 900° C. The loss of weight of the reactants calculated as $CO_2$ corresponded very closely to a 100% yield of $NaFeO_2$, sodium ferrite. No further weight loss occurred when samples of the ferrite were heated for four hours at 400° C. The sodium ferrite so produced was utilized in the experiments of the following examples.

EXAMPLE 1

A run was made at sub-atmospheric pressure in a vertical ¼ inch "Inconel" pipe to produce sodium by reaction between iron and sodium ferrite. An intimate mixture of 2 g. of iron powder and 4 g. of sodium ferrite was charged into the pipe. The pressure on the system was reduced to about 2 mm. Hg by means of a vacuum pump connected to the upper end of the pipe. The lower end of the retort was heated rapidly to a maximum temperature of 1250°±25° C., heating being continued for about ten minutes. When the retort was cooled, several small droplets of sodium were found condensed at the upper end of the vertical tube. These drops were carefully collected and weighed. They were found to total about 0.11 g.

While the exact reaction taking place in this mixture was not determined, the equation therefor may be:

(2) $2NaFeO_2 + Fe \rightarrow 2Na + Fe_3O_4$ or (3) $NaFeO_2 + Fe \rightarrow Na + 2FeO$ The 0.11 g. sodium product obtained above represents a yield of about 13% of the theoretical based on Equation (3).

EXAMPLE 2

Several runs were made to determine the partial pressure of sodium vapor over the reaction mixture at various temperatures. Mixed charges, similar in composition to that shown above, were placed in a nickel boat and the boat inserted into a horizontal section of "Inconel" tube. The section of the tube containing the boat was inductively heated to a temperature varying not more than about ±25° C. at 1200° C. over a three inch length. Nitrogen, purified over heated copper turnings, ascarite, flake KOH and $P_2O_5$, was passed through the tube and over the boat at atmospheric pressure. The nitrogen stream was metered at the outlet with a test meter.

Evolved sodium was condensed in the cold outlet end of the tube and entrained sodium smoke stopped with a plug of nickel gauze backed up by another plug of glass wool. The metallic sodium was determined by refluxing water through the tube in the purified nitrogen stream. The hydrogen resulting from this procedure was thoroughly dried and passed over heated copper oxide. The water from the reaction between copper oxide and hydrogen was then absorbed in $P_2O_5$ and weighed. Results obtained are tabulated in:

Table I.—Partial pressure of sodium vapor

| Run | Temperature (±25° C.) | Pressure, mm. Hg |
|---|---|---|
| 1 | 1,100° C. | 2.8 |
| 2 | 1,100° C. | 3.9 |
| 3 | 1,100° C. | 4.7 |
| 4 | 1,200° C. | 7.6 |

While the values at 1100° C. vary somewhat, all runs indicate production of sodium, the amount increasing with the temperature. Thermodynamic considerations indicate that the pressure of one atmosphere for sodium vapor from the reaction of Equation (3) would be reached at about 1450° C.

Several advantages are achieved by the process of reacting sodium ferrite with iron. For example, a comparatively low endothermic reaction heat is required, amounting to about 107 kg. cal. or 141 kg. cal. if the initial formation of the ferrite be considered. These values compare with 230 kg. cal. for production of sodium by reduction of $Na_2CO_3$ with C, the basis of the DeVille process. In addition, sodium is prepared from very cheap raw materials, $Na_2CO_3$, $Fe_2O_3$ and scrap iron. Isolation of the intermediate sodium ferrite is shown and is desirable because removal of $CO_2$ eliminates any possibility of reaction of sodium therewith. Furthermore, the reaction residue, magnetite slag, may be utilized as a charging stock for a blast furnace and may replace some of the scrap iron now employed.

Various modifications of my process will be evident to those skilled in the art. Instead of the iron shown in the examples, iron alloys such as ferrosilicon may be utilized. Other reducing metals, aluminum for example, may perhaps be substituted for iron but economic considerations make the latter preferred. It is furthermore not essential that the sodium ferrite reactant be absolutely pure. Other iron and oxygen salts of sodium such as the ferrate and hypoferrite may contaminate or even be substituted for the ferrite, the last named however being more easily prepared than the others.

The physical conditions required for the reaction are determined by general chemical considerations. The reactants should, for example, be either liquid or highly comminuted. Molten iron or steel may therefore be substituted for powdered iron. It may be noted that sodium ferrite has a lower melting point than iron but this factor is not of importance to the sodium production. Some reaction may take place between massy solids but at an impracticably slow rate or to a slight extent. Agitation of either comminuted solids or liquids may be carried out as desired. The reaction temperature should generally be above the boiling point of sodium for ease in removing the sodium vapor but below that of the replacing metal. Some formation of the desired metal may occur below its boiling point but if so recovery then becomes a problem.

Sodium vapor has been exemplified as drawn away from the reaction mixture by distillation in a vacuum created by a pump or by a stream of inert gas. The pressure is thus seen as not critical so long as the produced vapor is continuously removed from the vicinity of the reactants. Nitrogen has been disclosed as a preferred carrier of sodium vapor. Other inert gases may however be substituted for the nitrogen, commercially available examples of such gases being argon and helium.

Having now described my invention, I claim:

1. The method of producing sodium which comprises reacting a member of the group consisting of sodium ferrite, sodium ferrate and sodium hypoferrite with iron at a temperature of not less than about 1100° C. and a partial pressure of sodium vapor of not more than about 2 mm. of mercury.

2. The method of producing sodium which comprises reacting sodium ferrite with iron at a temperature above about 1100° C. and a partial pressure of sodium of not above about 2 mm. of mercury, distilling evolved sodium vapor from the vicinity of the reactants at said pressure and subsequently condensing the sodium vapor.

3. The method of producing sodium which comprises reacting sodium ferrite with iron at a temperature of between about 1100 and 1450° C., entraining evolved sodium vapor in a moving stream of inert gas maintained at ambient pressure of about one atmosphere and subsequently condensing said vapor and collecting metallic sodium.

4. The method of claim 3 in which the inert gas is nitrogen.

References Cited in the file of this patent

UNITED STATES PATENTS

| | | |
|---|---|---|
| 1,016,758 | Mehner | Feb. 6, 1912 |
| 2,391,728 | McConica | Dec. 25, 1945 |